Fig. 1.

INVENTOR
John E. Drake.

Fig. 2.

| Motor Operation | Brake Lever 234 | Master Controller MC | Sequence Step | Switches | | | | | | | | | | | | |
|---|---|---|---|---|---|---|---|---|---|---|---|---|---|---|---|---|
| | | | | LS1 | G1 | LS2 | JR | J | M,G | 1-2 | 3-4 | 9-10 | B1 | B2 | B5 | B6 |
| Switching | Off | 1 | 1 | o | o | | o | | | | | | | | | |
| Progression to full series | Off | 2 | 2 | o | o | o | o | | | | | | | | | |
| | | | 3 | o | o | o | o | | | o | | | | | | |
| | | | 4 | o | o | o | o | | | o | o | | | | | |
| | | | 5 | o | o | o | o | | | o | | o | | | | |
| | | | 6 | o | o | o | | o | | o | | | | | | |
| Progression to full parallel | Off | 3 | T | o | o | o | | o | o | o | | | | | | |
| | | | 7 | o | o | o | | | o | o | | | | | | |
| | | | 8 | o | o | o | | | o | o | o | | | | | |
| | | | 9 | o | o | o | | | o | o | | o | | | | |
| Coasting | Off | Off | 1 | | | | | | o | | | | o | | | |
| Progression to full dynamic braking | On | Off | 2 | | | | | | o | | | | o | o | | |
| | | | 3 | | | | | | o | | | | | | o | |
| | | | 4 | | | | | | o | | | | | | o | o |
| | | | 5 | | | | | | o | | | | | o | o | o |
| | | | 6 | | | | | | o | o | | | | o | o | o |
| | | | 7 | | | | | | o | o | o | | | o | o | o |
| | | | 8 | | | | | | o | o | | o | | o | o | o |

Fig. 3.

UNITED STATES PATENT OFFICE 2,637,009

DOOR-CONTROLLED RAILWAY-CONTROL APPARATUS

John E. Drake, Glen Rock, N. J., assignor to Westinghouse Electric Corporation, East Pittsburgh, Pa., a corporation of Pennsylvania Application November 28, 1951, Serial No. 258,712

24 Claims. (Cl. 318—364)

My invention relates to railway-control apparatus, and it has particular relation to such apparatus for trains of multiple-unit cars, which usually include a provision for dynamic braking, and which also include a response to a door-relay which is actuated by a door-switch relay-circuit which is closed when all of the doors of the train are closed.

An object of my invention is to provide the above-mentioned door-relay with a back-contact which establishes an emergency-circuit for setting up a dynamic-braking circuit for the traction-motors as soon as the door-relay drops out (if this should happen during a motoring operation), without waiting for the accelerating-controller to be returned to its off-position. By this means, if the door-switch relay-circuit should become interrupted while the train is being propelled by the traction-motors, a dynamic-braking circuit will be instantly available, without waiting for the motorman to return his accelerating-controller to its off-position.

Another object of my invention is to provide an auxiliary door-relay, which is actuated by a push-button, and which thereafter holds itself in its actuated position, so that the motorman can proceed, on signal from the conductor, in case it should be necessary to move the train while one of the doors is open, or while there is some defect in the door-switch relay-circuit. The holding circuit for the auxiliary door-relay makes it possible for the motorman to release this emergency push-button while operating his train "on signal" while bypassing the main door-relay, thus freeing one hand for necessary other operations which require a second hand in addition to the hand which is on the accelerating-controller.

The holding-circuit for the auxiliary door-relay is preferably also under the control of an emergency-relay which is actuated by air-pressure in the brake-pipe of the train, so that, when this brake-pipe is exhausted, for an emergency-application of the brakes, the emergency-relay will kill the holding-circuit for the auxiliary door-relay. This feature of my invention is particularly applicable in a railway-control apparatus in which provision is made for automatically establishing a dynamic-braking circuit for the traction-motors whenever the motoring circuit is interrupted and the accelerating-controller is in its off-position.

A still further object of my invention is to combine the above-described novel features, or any one of them, in a railway-control apparatus which uses a protective relay as described and claimed in an application of L. G. Riley, Serial No. 95,904, filed May 28, 1949. This protective relay has suitable actuating and holding means, whereby said relay has to be re-actuated each time a power-circuit is established for commencing a period of motoring-operation of the traction-motors, and said relay has contacts in series with the means for establishing the dynamic-braking motoring-circuit, so that this dynamic-braking circuit cannot be established, except after a period of power-application to the traction-motors.

The railway-control apparatus for which my invention was particularly designed was also provided with a progressively operating power-circuit control-means, for automatically accelerating the traction-motors during their motoring-operation, and a progressively operating braking-controlling means, for controlling the dynamic-braking motor-conditions, and the protective relay had make-contacts in series with the progressively operating braking-controlling means, and preferably also in series with the progressively operating motoring-circuit controlling-means.

The actuating and holding circuits for this protective relay are so designed that the protective relay is kept energized during the notching-off movement of the accelerating-controller, so that a dynamic-braking circuit is set up as soon as power is removed from the traction-motors. This initial dynamic-braking circuit is a relatively weak circuit. A strong or sensible application of dynamic braking is not obtained until a braking-controller is actuated, so as to initiate the operation of the progressively operating braking-controlling means.

With the foregoing and other objects in view, my invention consists in the circuits, systems, combinations, apparatus, parts, and methods of design and operation, hereinafter described and claimed, and illustrated in the accompanying drawing, wherein:

Figure 1:
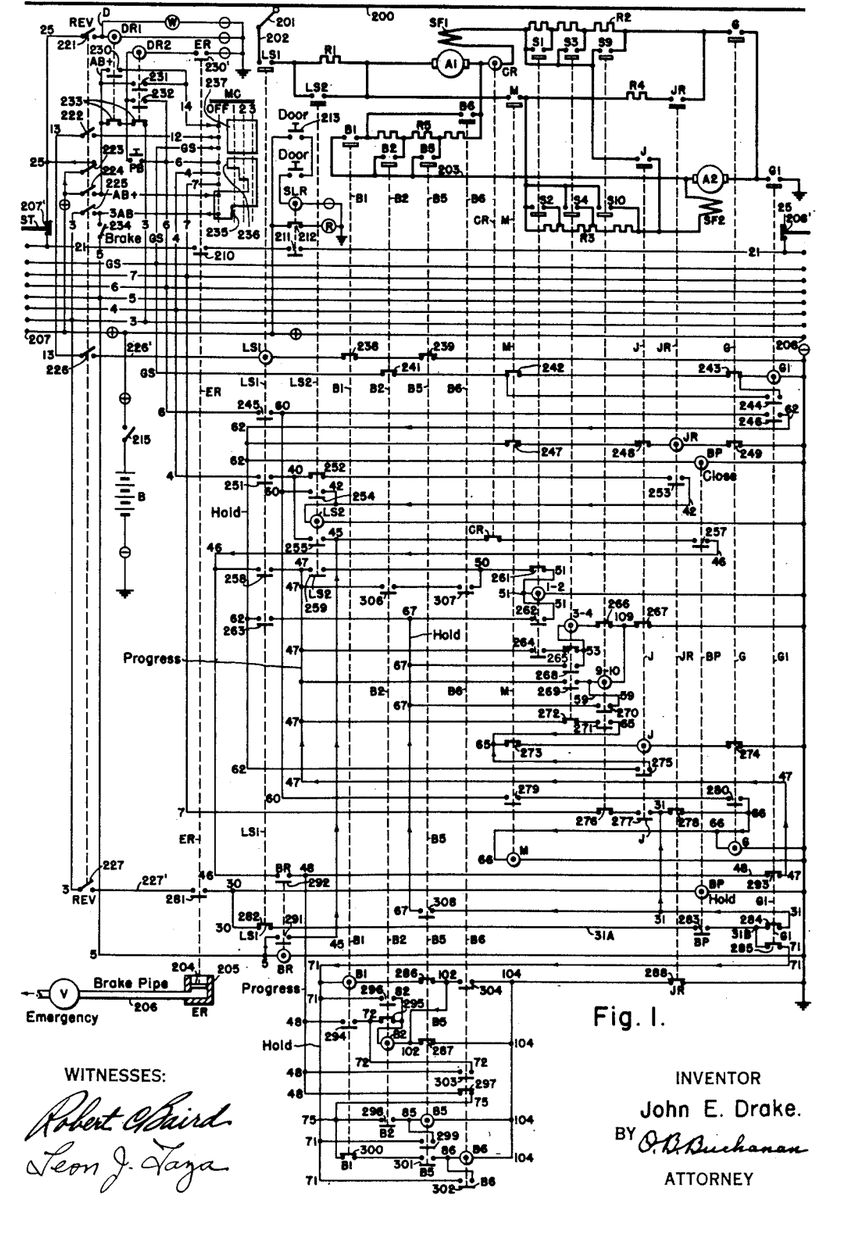
Figure 1 is a simplified circuit-diagram of the parts of one car, which are necessary to illustrate my present invention, omitting the master-controller at the right-hand end of the car, and omitting the no-voltage relay and many other parts which are known to be needed in a successful railway-control equipment of the type to which my invention is applied, but which are not necessary to be discussed in setting forth the nature and operation of my present improvements.

Fig. 1 represents some of the equipment which is carried by a single electrically propelled railway-car embodying my invention. Direct-current power is supplied to the car from a trolley-wire 200, which is engaged by a trolley-pole 201, or other current-collecting equipment, carried by the car. The trolley-pole 201 energizes a line 202 which constitutes a supply-circuit for the car. The traction-motors for the car are indicated, by way of example, as comprising two motor-armatures A1 and A2, each being associated with its own series field winding SF1 and SF2, respectively, the ordinary reversing-switches being omitted for the sake of simplicity. A series-parallel motor-control arrangement is shown, in which a line-switch LS1 and a ground-switch G1 are used as power-switch means for establishing a power-circuit for energizing the motors from the supply-circuit 202. For completing the series-circuit connections, a switch JR is closed in addition to the power-switches LS1 and G1; while, for parallel-motor operation, two switches M and G are closed in addition to the power-switches LS1 and G1. During an intermediate transition-period, a switch J is closed, all in accordance with a well-known switching-system. Dynamic-braking circuits are established by opening the two power-switches LS1 and G1 and closing a braking-switch B1 in addition to the two switches M and G, also in accordance with a well-known system or arrangement.

A suitable number of serially connected accelerating resistances are used, as indicated at R1, R2, R3 and R4, the resistance R1 being shorted out by means of a second line-switch LS2; the resistance R2 being progressively shorted out by means of switch-contacts S1, S3 and S9; and the resistance R3 being progressively shorted out by switch-contacts S2, S4 and S10; while the resistance R4 is finally shorted out by the transition-switch J, for obtaining the full-series power-circuit connection of the motors. During parallel motor operation, the switch-contacts S3, S4 and S9, S10 are progressively closed, during the acceleration of the motor. The foregoing is a very much simplified indication of the bare essentials of the motor-control, omitting the usual weakened-field control, which is usually used, but which is not essential to an understanding of my present improvements.

During dynamic braking, the two motors are connected by a dynamic-braking circuit 203 which contains the braking-switch B1 and a braking-resistance R5. This resistance R5 is used, in addition to the previously mentioned accelerating-resistances R2 and R3, in establishing the complete dynamic-braking circuit. The braking-resistance R5 is progressively shorted out by means of braking-switches B2, B5 and B6, during dynamic-braking operations, after which the resistances R2 and R3, or portions thereof, are progressively shorted out, as by the switch-contacts S3, S4, and S9, S10, the switch contacts S1 and S2 being permanently closed during the dynamic-braking operations, in the illustrated system.

The progressive operation of the various resistance-shorting switches, during both motoring operation and dynamic braking, is under the automatic control of a suitable limit-relay or relays which are energized to be responsive to conditions which accompany excessive torque in the motors. Such a limit-relay is illustrated in the form of a current-relay CR, having an actuating-coil CR which is connected in series-circuit relation between the motor-armature A1 and its series field SF1. This current-relay CR also has a back-contact CR which is normally closed, that is, which is closed in the non-actuated position of the relay.

All of the electrically controlled relays and switches which are shown in Fig. 1 are diagrammatically indicated as having vertical switch-stems, indicated by dotted lines, which are biased by gravity toward their lowermost positions, and all of these switches and relays are shown, in Fig. 1, in their deenergized or non-actuated positions. All of the relays and switches, except the reverser REV and the emergency-relay ER, are electrically controlled, and they are illustrated as being electrically or magnetically operated, by means of an appropriately numbered or lettered coil or solenoid, represented by a circle, acting magnetically to lift an armature which is represented diagrammatically by a smaller circle inside of the coil-circle.

The emergency-relay ER is raised or actuated by means of a piston 204 which operates within a cylinder 205, which receives compressed air through a brake-pipe 206 which runs the entire length of the train, and which normally contains over 70 pounds of air-pressure, for controlling the operation of the air-brakes (not shown). The brake-pipe 206 can be vented to the atmosphere, for an emergency-application of all of the air-brakes on the train, by any one of various means, indicated in Fig. 1 by means of an emergency-valve V.

The various electrical control-circuits for the train are under the control of a number of train-line wires, which extend from car to car, throughout the entire length of the train. In the simplified circuit-diagram of Fig. 1, eight of these train-line wires are indicated, being given their usual designations, namely (+), 3, 4, 5, 6, 7, GS, and 21. These wires extend from end to end through each car, from one coupler 207 to the other coupler 208. Cooperating with each coupler is a coupler-switch 207′ or 208′, as the case may be, each coupler-switch being closed when the associated coupler is unattached to any other car at that point, but each coupler-switch is provided with a stem ST which opens the coupler-switch when the coupler is attached to a corresponding coupler on the next car of the train. These coupler-switches 207′ and 208′ are used, respectively, to connect the train-line wire 21 to a circuit 25 at the corresponding end of the train.

The train-line wire 21, on each car, is a part of the door-switch relay-circuit. It contains a serially connected make-contact 210 of the emergency-relay ER on that car, and also a serially connected make-contact 211 of a signal-light relay SLR on that car. The signal-light relay SLR has a back-contact 212 which lights one or more red lights R, usually located over each door of the car. The signal-light relay SLR has an operating-coil SLR, which is energized in series with the various door-switches 213 which are closed when the respective doors are closed.

Energy for the various relay-circuits is provided by means of a battery B on each car. The negative terminal (—) of each battery is permanently grounded, while the positive terminal of each battery is connected, through a switch 215, to the positive train-line wire (+).

Each end of each car is provided with a motorman's master controller MC, only one of which is indicated in Fig. 1. The illustrated master controller MC is indicated as being an accelerating-controller having an off-position and three on-positions 1, 2 and 3. Associated with each master controller is a reversing-switch or reverser, which is diagrammatically indicated as a multi-pole knife-switch REV, in Fig. 1. In order to activate his master controller MC, the motorman must move this reverser REV from its off-position, which is illustrated as its raised position, to an on-position, which would be represented by a lowered position of the diagrammatically indicated reverser REV in Fig. 1.

The simplified reverser REV which is diagrammatically indicated in Fig. 1 has seven contacts, which will be described, starting with the top contact 221, which is a reverser-on interlock, closed when the reversed is in an on-position, and used to connect the wire 25 to a door-controlled wire D. The second reverser-contact 222 is also an on-interlock, which connects a wire 12 to a wire 13. The third reverser-contact 223 is an off-interlock which, in the off-position of the reverser REV, connects the positive train-line wire (+) to the wire 25. The fourth reverser-contact 224 is an on-interlock which, in an on-position of the reverser REV, connects the positive train-wire (+) to a wire AB+. The fifth reverser-contact 225 is an on-interlock which connects a wire 3AB to the train-line wire 3. The sixth reverser-contact 226 is an on-interlock which connects the wire 13 to a wire 226'. The seventh or lower-most reverser-contact 227 is an on-interlock which connects the train-line wire 3 to a wire 227'.

Cooperating with the motorman's control-equipment which is indicated by the master controller MC, at each end of each car, there is also provided a main door-relay DR1, having an operating-coil DR1 which is connected between the door-controlled wire D and the negative battery-terminal (—) or ground. Also connected between this door-controlled wire D and ground, is a white signal-light W which lights up when all of the doors are closed, that is, when the door-switch relay-circuit 21 is energized throughout the train.

Figure 2:
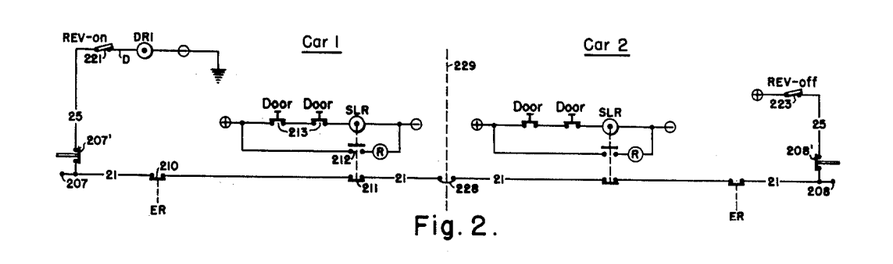
Fig. 2 is a simplified diagrammatic view of the door-switch relay-circuit part of a two-car train, showing the positions of the circuit-elements when the train-doors are all closed.

Reference to Fig. 2 will show more clearly how this train-long door-switch relay-circuit 21 operates. In this figure, a two-car train is indicated, with the motorman supposed to be seated at the front end of car No. 1, with his reversing switch REV in its on-position, at that end, thus closing the REV-on interlock 221 at that end of the train. At all other stations for the motorman, the reverser-switch is off. Between the two cars Nos. 1 and 2, the train-line wires 21 are connected together, as indicated at 228, at the coupler 229, and the coupler-switches 207' and 208' are both open at this location, so that they do not appear in the schematic diagram of Fig. 2. At the front and rear ends of the train, the coupler-switches 207' and 208' are closed, thus connecting the train-line wire 21 to the wire 25 at the front end of the first car, No. 1, and the rear end of car No. 2, which is the last car of the train. At the rear end of car No. 2, this wire 25 is connected, through the REV-off interlock 223, to the positive train-line wire (+). The relay-circuit energy for the complete door-switch relay-circuit 21 thus commences, at the rear end of the train, with the REV-off interlock 223, and, assuming that all of the doors are closed, this circuit runs on through, to the front end of the train, where it is connected, by the REV-on interlock 221, to the door-controlled wire D which energizes the coil DR1 of the main door-switch DR1 at that end of the train.

Referring back to Fig. 1, it will be noted that the main door-relay DR1 is provided with a make-contact 230, which connects the wire AB+ to a control-wire 14 which is the main control-supply line for the master controller MC. In each of the three on-positions of the master-controller or accelerating-controller MC, this control-wire 14 is connected both to the wire 12 and to the train-wire GS. The wire 12 is the energizing-wire for the operating-coil LS1 of the line-switch LS1; while the train-line wire GS is the energizing-wire for the operating-coil G1 of the ground-switch G1, as will be subsequently described.

It will be observed that these power-switches LS1 and G1 receive their control-circuit power from the master-controller supply-line 14, which, in turn, receives its energization through the make-contact 230 of the main door-relay DR1. If any one of the numerous door-switches 213 of the entire train fails to close, or if the door-switch relay-circuit 21 becomes open or defective for any other reason, the motorman cannot receive control-power for energizing the traction-motors of the train through this main door-relay DR1, nor can he obtain a signal-light W, indicating that all is clear, ready to start up his train. Under such circumstances, provision has been made, in the past, for the motorman to proceed, on signal from the conductor, in which case he has been equipped with a push-button which he could depress to bypass the make-contact 230 of the main-door relay DR1, but heretofore the motorman has had to keep a finger on that push-button all of the time while the train was operating under such emergency-conditions. If his finger should slip off of said push-button for even an instant, he would lose dynamic braking, so that he would have only his air-brakes (and in the usual set-up, only his emergency air-brakes) for bringing the train to a stop. Furthermore, the motorman frequently needed his extra hand for purposes other than holding down that emergency push-button.

In accordance with my present invention, I provide an auxiliary door-relay DR2, and I use the emergency push-button PB as a means for energizing this auxiliary door-relay DR2, rather than as a means for directly bypassing the make-contact 230 of the main door-relay DR1, as has heretofore been the custom. I connect this emergency push-button PB between any suitable source of relaying-energy, such as the train-line wire 6, and the operating-coil DR2 of the auxiliary door-relay DR2. The train-line wire 6 is a wire which is energized in all three of the on-positions of the master-controller MC, receiving its energization, in the illustrated example, from the control-wire AB+. This auxiliary door-relay DR2 has two make-contacts 231 and 232, the first of which bypasses the make-contact 230 of the main door-relay DR1, while the second make-contact 232 bypasses the emergency push-button PB.

The energizing-circuit for the DR2-coil also includes an emergency-relay make-contact 230', which is closed when the emergency-relay ER is in its normal actuated position, indicating the presence of the requisite air-pressure in the brake-pipe 206, it being understood that the emergency-relay is shown in its non-actuated or emergency position, which it assumes when the brake-pipe 206 is drained of air, as through an opening of an emergency-valve V.

Another feature of my present invention is the equipment of both of the door-relays DR1 and DR2 with a back-contact 233, these contacts being connected in series with each other, between the control-wire AB+ and the train-line wire 3, which is the wire which controls the dynamic braking and the energization of a hold-coil BP-hold of a braking-operation protective-relay BP, which will be subsequently described.

In the second and third on-positions of the accelerating-drum of the master controller MC, the train-line wire 4 is energized from the control-wire AB+; while in the third on-position of this controller, the train-line wire 7 is energized from the control-wire AB+.

In the off-position of the accelerating drum of the master controller MC, a connection is made from the control-wire AB+ to the control-wire 3AB, and the control-wire 3AB is not only connected, through the REV-on interlock 226, to the train-line wire 3, but this control-wire 3AB is also connectable, through a brake-lever 234, to the train-line wire 5. In the master controller MC, there is an overlap between the braking-circuit off-position contact 235, which energizes the conductor 3AB, and the motoring-circuit on-position contacts 236 and/or 237, which energize the conductor 6 and/or the conductors 12 and GS, so that, during the notching-off of the master-controller MC, the contact at 235 is made before the contact or contacts at 236 and/or 237 are broken. This overlapping construction is particularly necessary in properly controlling the braking-operation protective-relay BP which will be subsequently described, and which also constitutes the subject matter of the previously mentioned Riley application.

Figure 3:
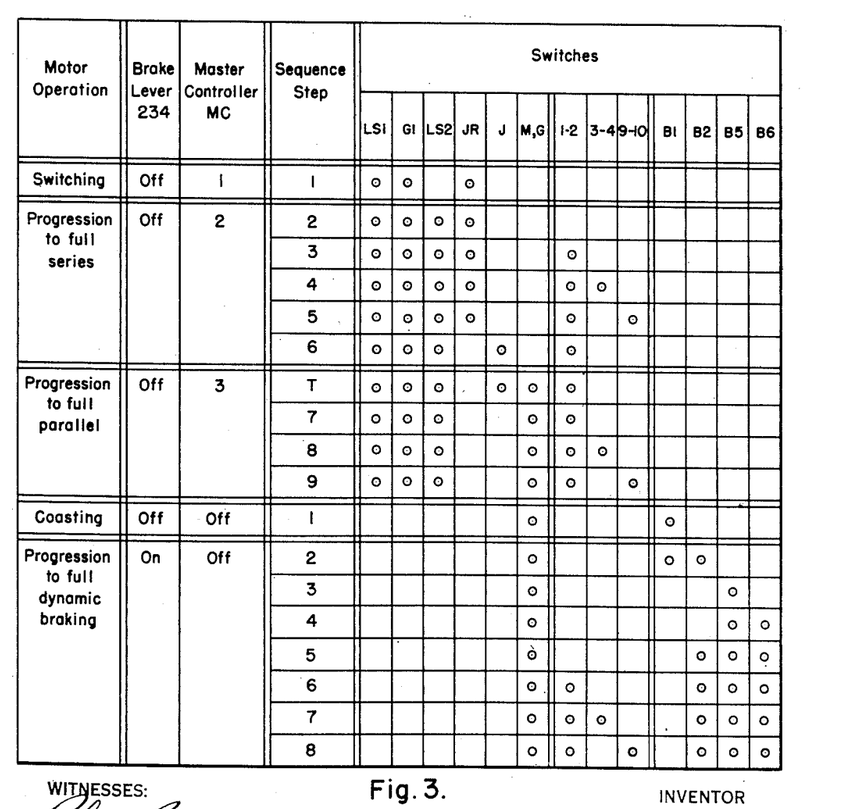
Fig. 3 is a sequence-chart.

The circuits and the operations, under the control of the various control-wires 13, GS, 6, 4, 7, 3 and 5, are best described together, with special emphasis on the novel features of my present invention. Reference may be made to the previously mentioned copending Riley application, and also to a Riley and Purifoy Patent 2,523,143, granted September 19, 1950, for further explanations of previously known features with which my present invention cooperates. Reference may also be had to Fig. 3 of the accompanying drawings, which shows the sequence of the switching operations.

The first on-position of the accelerating controller MC, in Fig. 1, is a switching position, in which the control-wires 12—13—226', GS, and 6 are all energized. The control-wire 226' energizes the operating-coil LS1 of the line-switch LS1, through interlocks which are provided, by the braking-switches B1 and B5, in the form of back-contacts 238 and 239, respectively.

The train-line wire GS energizes the operating-coil G1 of the ground-switch G1, through interlocks which are provided, by the braking-switch B2 and the parallel-operation and braking-operation switches M and G, in the form of back-contacts 241, 242 and 243, respectively; and this ground-switch G1 is provided with a make-contact 244 which bypasses the M and G-interlocks 242 and 243.

The train-line wire 6 is connected, through an LS1 make-contact 245, to a relay-circuit 60, which is connected, through a G1 make-contact 246, to a circuit 62 which constitutes a hold-circuit for the switch-progression for the accelerating-resistance short-circuiting switches S1 to S10 and J. This hold-circuit 62 is used to energize the operating coil JR of the series-motor-circuit switch JR, through interlocks on the switches M, J and G, in the form of back-contacts 247, 248 and 249, respectively. The said hold-circuit 62 is also used to directly energize the close coil or actuating-coil BP-close of the braking-operation protective-relay BP.

The result of the master-control energizations, in the No. 1 on-position of the master-controller MC, is thus to close the main-circuit or power-circuit contacts of the traction-motor switches LS1, G1 and JR, thereby completing a series-connection motor-circuit for causing a slow movement of the train, for so-called "switching" purposes, with all of the accelerating-resistances in series with the motors. This circuit can be traced from the supply-circuit 202, through the main LS1 contact, the resistor R1, the armature A1, the current-relay coil CR, the series field SF1, the resistance R1, the main JR contact, the resistance R4, the resistance R3, the series field SF2, the motor armature A2, and the main G1 contacts, to ground.

At the same time, the energization of the braking-operation protective-relay BP paves the way for the subsequent energization of the dynamic-braking circuits of the motors, and also for the automatic progression-control, under the control of the limit-relay or current-relay CR, both for the motoring progression during acceleration, and for the dynamic-braking progression during an application of the brake-lever 234, as will be subsequently described.

The No. 2 position of the accelerating-controller MC energizes the train-line wire 4 which is connected, through an LS1 make-contact 251, to a conductor 40. The conductor 40 is connected, through an LS2 back-contact 252, and a JR make-contact 253, to a conductor 42, which energizes the operating-coil LS2 of the second line-switch LS2, which short-circuits the first accelerating-resistor R1. This LS2 switch has a make-contact 254 which picks up and serves as a holding-circuit contact between the circuits 60 and 42. This second line-switch LS2 also has a make-contact 255 which connects the circuit 40 to the circuit 45, which is connected, through the limit-relay back-contact CR, and a BP make-contact 257, to a circuit 46 which constitutes the main limit-relay progression-circuit of the control-equipment. This limit-relay progression-circuit 46 is thus not only under the control of the limit-relay or current-relay CR, which is responsive to excessive motor-currents, but it is also under the control of the braking-operation protective-relay BP, which must be closed (with the protective relay in its actuated position), before there can be any progression during either the motoring operation or the braking operation.

This limit-relay progression-circuit 46 is connected, through an LS1 make-contact 258, to a progression-wire 47, which is connected through an LS2 make-contact 259 to a control-wire 50. The control-wire 50 energizes the operating-coil 1—2 for a resistor-shorting progression-switch which carries the two main contacts S1 and S2, this energization being effected through a back-contact 261 of this same switch 1—2. Thus, this energizing-circuit from the conductor 50 includes the switch-out interlock 261, a conductor 51, and the coil 1—2. The switch 1—2 picks up and closes a holding-circuit make-contact 262, which energizes the circuit 51 from a hold-circuit 67, which is connected to the previously described hold-circuit 62 through an LS1 make-contact 263.

The actuation of the resistance-shorting switch 1—2 also closes a make-contact 264, which energizes a circuit 53 from the progression-circuit 47, through a back-contact 265 of a resistance-shorting switch 3—4, which is the switch which carries the main switching-contacts S3 and S4. The energizing circuit for this switch extends from the conductor 53, through the operating coil 3—4 and a back-contact 266 of a resistance-shorting switch 9—10, thence through a control-circuit conductor 109, and a J-switch back-contact 267, to the grounded negative battery-terminal (—). The actuation of the resistance-shorting switch 3—4 closes a make-contact 268 which establishes a holding-circuit from the conductor 53 back to the hold-wire 67.

The actuation of the progression-switch 3—4 also closes a make-contact 269, which completes a circuit from the progression-wire 47 to a conductor 59, which energizes the actuating coil 9—10 of the resistance-shorting switch which carries the main switching-contacts S9 and S10, the negative terminal of the coil 9—10 being connected to the previously described wire 109. The actuation of the switch 9—10 closes a make-contact 270 which establishes a holding-circuit from the conductor 59 back to the hold-wire 67.

The actuation of the resistance-shorting switch 9—10 also closes a make-contact 271, which is connected between the progression-wire 47, a back-contact 272 of the resistance-shorting switch 3—4, and a circuit 65, thus energizing the operating-coil J of the transition-switch J, through the M and G back-contacts 273 and 274, respectively. The transition-switch J then closes its main or power-circuit contact J, which constitutes the last step in the series motor-connection for the traction-motors, cutting out the last accelerating-resistance R4. This transition-switch J has a make-contact 275 which establishes a holding-circuit from the conductor 65 back to the hold-line 62. The previously described J-switch back-contacts 248 and 267 are opened, upon the energization of the transition-switch J, thus dropping out the initial series-connection switch JR, and the accelerating switches 3—4 and 9—10.

The next stop in the acceleration of the traction-motors is accomplished by a movement of the master-controller MC to its No. 3 position, which energizes the train-line wire 7. This train-wire 7 is connected, through a back-contact 276 of the resistance-shorting switch 9—10, and a make-contact 277 of the transition-switch J, so as to energize a control-circuit 31, which is in turn connected, through a JR back-contact 278, to a control-circuit 66 which energizes the operating coils M and G of the parallel-motor-connection switches M and G, which thus connect the traction-motors in parallel between the supply-circuit 202 and ground, with only two of the resistance-shorting switches energized, namely the second line-switch LS2, and the switch 1—2 which carries the main switching-contacts S1 and S2. The energization of the parallel-connection switches M and G opens the previously described back-contacts 273 and 274, which drop out the transition-switch J. The energization of these M and G switches also closes their make-contacts 279 and 280, respectively, which establish a holding-circuit from the conductor 66 back to the line 60.

Responsive to the dropping-out of the transition-switch J, the back-contact 267 of this switch recloses, and re-initiates the switch-progression of the resistance-shorting contacts S3 to S10, under the control of the switches 3—4 and 9—10, through the circuits which have been previously described. This completes the full-parallel connection of the traction-motors, in the simplified control-system which is shown in Fig. 1, as indicated also in the sequence-chart of Fig. 3.

It will be noted that the continuance of a power-circuit connection for the motoring-operation of the traction-motors is dependent upon a continuance of the energization of the power-switches LS1 and G1, which derive their control-circuit energization from the supply-conductor 14 of the master controller MC, thus putting these power-switches under the control of the main door-relay DR1, whose make-contact 230 energizes the master-controller supply-line 14. In an actual installation, there are other means (not shown) which are capable of deenergizing the power-switches LS1 and G1, but the main door-relay DR1 is sufficient to illustrate the general principle of providing a control-circuit in which the power-relays LS1 and G1 may become deenergized, as, for example, in the event of the opening of a door, or other interruption in the door-switch relay-circuit 21. Any dropping-out of the power-switches LS1 and G1, during the motoring operation, results in the opening of the LS1 and G1 make-contacts 245 and 246, which drop out all of the other motoring switches, so that, when and if the power-switches LS1 and G1 again become energized, the traction-motors will be reconnected in their series-connection circuit, with all of the accelerating resistance in circuit, and the motor-circuit progression will immediately commence all over again, provided that the braking-protective relay BP is closed or recloses.

In previously known railway-control systems which have been provided with a main door-relay such as DR1, the door-relay back-contact 233 has not been provided, so that the loss of a door-switch 213 during the motoring operation would not result in the energization of the train-line wire 3 until the motorman had moved this controller to the off-position. In my present system, any deenergization of the main door-relay DR1, or of both of the door-relays DR1 and DR2 (in case my auxiliary door-relay DR2 is used), will result in the instant energization of the train-line wire 3, from the control-wire AB+, so that dynamic braking will be instantly available, as will now be described.

Any energization of the train-line wire 3 will result in the establishment of the dynamic-braking connections of the traction-motors, provided that the braking-protective relay BP is actuated, as will subsequently be described. I have shown two ways in which the brake-wire 3 may become energized. The normal way is for the motorman to move his accelerating-controller MC to the off-position, which energizes the control-circuit 3AB, and hence the brake-line 3, from the control-circuit AB+. A second energizing-means for the brake-wire 3 is through the simultaneous deenergization of both of the door-relays DR1 and DR2, which energizes the brake-wire 3 from the control-wire AB+.

Assuming now, that the brake-wire 3 is energized, a circuit from this wire continues through the REV-on interlock 227 to the wire 227', and thence through an emergency-relay make-contact 281, which energizes a control-conductor 30. This conductor 30 directly energizes the hold-coil BP-hold of the braking-protective relay BP, and this hold-coil is intended to be representative of any holding-means which is effective only after the protective relay BP has previously been moved to its actuated position. When a separate holding-coil BP-hold is used as such a holding-means for the BP relay, said coil will be made so as to be too weak to pick up the BP relay if the relay is in its non-actuated position when the hold-coil is energized, but the hold-coil BP-hold has enough energy to hold the relay actuated or closed, once it has been actuated.

The control-circuit 30 is also connected, through an LS1 back-contact 282, to a control-circuit 31A, which is connected, through a BP make-contact 283, to a control-circuit 31B. This control-circuit 31B is connected, through a G1 back-contact 284, to the previously described control-circuit wire 31, which energizes the previously described parallel-motor switches M and G. The control-conductor 31B is also connected, through a G1 back-contact 285, to a braking-operation hold-wire 71, which is connected to the positive terminal of the braking-switch coil B1, the negative terminal of which is connected in a circuit which includes a B5 back-contact 286, a conductor 102, another B5 back-contact 287, a conductor 104, and a JR back-contact 288, and thence to the grounded negative battery-terminal (—). The closure of the switches M, G and B1 completes the establishment of a weak dynamic-braking circuit for the traction-motors, with all of the available dynamic-braking resistances R5, R2 and R3 in circuit, this dynamic-braking resistance being large enough so that the braking tractive-effort is usually quite weak, permitting the train to coast, with little or no sensible or perceptible braking effect.

It will now be seen why it is important to have a contact-overlap, in the master controller MC, at the points 235 aand 236 and/or 237, as was provided for in the previously mentioned copending Riley application. The same reason applies also to my new provision of the door-relay back-contacts 233 for immediately energizing the brake-wire 3 as soon as the main door-relay DR1 becomes deenergized, in case this should happen during a motoring-operation. It is necessary, once the BP close-coil has been energized, to energize the BP hold-coil (or a holding-circuit) before the close-coil becomes deenergized, so as to keep the BP-relay energized, thus keeping the BP make-contact 283 energized, which is necessary for establishing the dynamic-braking circuit for the traction-motors. More will be said about this, in my final explanation of the novel features of the operation.

A service braking-application is made by the closure of the brake-lever 234, which energizes the full-brake wire 5. This wire is connected directly to the coil BR of a brake-relay BR, which was shown and described in the previously mentioned Riley and Purifoy patent. This brake-relay BR has two make-contacts 291 and 292, the first of which connects the full-brake line 5 to the conductor 45 which leads up to the limit-relay progression-circuit 46, thus putting the braking progression under the control of the limit-relay or current-relay CR, as well as under the control of the BP make-contact 257, both of which are in circuit between the conductor 45 and the limit-relay progression-circuit 46. The second BR make-contact 292 connects this limit-relay progression-circuit 46 to a braking-progression circuit 48, which is, in turn, connected, through a G1 out-contact or back-contact 293, to the previously mentioned acceleration-resistance progression-wire 47. The energization of the braking-circuit progression-wire 48 immediately serves, through a B1 make-contact 294, which is already closed, to energize a circuit 72, which is connected, through a B2 back-contact 295, to a circuit 82 which is connected to the positive terminal of the B2 actuating-coil, the negative terminal of which is connected to the previously described conductor 102. The B2-relay thus picks up and closes its main contact B2 which shorts out a part of the braking-resistance R5 in the dynamic-braking circuit of the traction-motors. The actuation of the B2 relay closes a make-contact 296 which establishes a holding-circuit from the wire 82 back to the hold-wire 71.

A circuit is next established from the lower end of the progression-wire 48, through a B6 back-contact 297, to a conductor 75, and thence through a B2 make-contact 298, which has just been closed, to a conductor 85 which is connected to the positive terminal of the B5 actuating-coil, the negative terminal of which is connected to the previously mentioned wire 104. The B5-switch closes its main-circuit contact B5, which shorts out more of the braking-resistance R5 in the dynamic-braking circuit of the traction-motors. At the same time, the B5-switch closes a make-contact 299 which establishes a holding-circuit from the conductor 85 back to the hold-wire 71.

The energization of the braking-progression switch B5 opens its back-contacts 286 and 287, thus dropping out the switches B1 and B2, the main contacts of which are both short-circuited, now, by the main contact B5. The dropping-out of the B1 switch closes its lowermost back-contact 300, which completes a circuit from the conductor 75 to a B5 make-contact 301, and thence to a wire 86, which is connected to the positive terminal of the B6 coil, the negative terminal of which is connected to the wire 104. The B6 switch thus closes, and closes its main contact B6 which still further reduces the effective braking-resisance in the dynamic-braking circuit. At the same time the actuation of the B6 switch closes its make-contact 302, which establishes a holding-circuit from the wire 86 back to the wire 71.

The actuation of the B6 switch closes a make-contact 303 which connects the progression-wire 48 to the previously described conductor 72, thereby reenergizing the B2 relay, the negative circuit of which is now completed from the wire 102, through a B6 make-contact 304, to the wire 104.

It will be understood that all of these braking-progression operations are under the control of the limit-relay progression-circuit 46, which interrupts the progression whenever an excessive motor-current causes an opening of the current-relay back-contact CR which is connected in the energizing circuit for said wire 46, thus interrupting the progression until the motor-current subsides to a desirable value.

After the second closure or actuation of the B2 switch, so that the B2 and B6 switches are now both closed, a circuit is made, from the accelerating-resistance progression-wire 47, through a B2 make-contact 306 and a B6 make-contact 307, to the previously described conductor 50, thus re-initiating the progression of the switches 1—2, 3—4, and 9—10, which progressively cut out the accelerating resistors R2 and R3 which are also in the dynamic-braking circuit of the traction-motors, this progression being also under the control of the limit-relay progression-circuit 46. Ever since the actuation of the B5 switch, a B5 make-contact 308 has been energizing the accelerating-resistance hold-circuit 67 from the wire 31, in readiness for this progression of the accelerating-resistor switches S1 to S10. The braking-progression thus continues until substantially all of the braking-resistance is removed from the dynamic-braking circuit, thus resulting in a full-brake application of dynamic braking.

The operation of the simplified illustrated apparatus will be clear from the running comments which have been made during the progress of the description, as well as from the prior art which is represented by the Riley and Purifoy patent and the copending Riley application. A few words of added explanation, as to the features which are more particularly related to my novel relay-circuit parts, may, however, be helpful.

One of the reasons why the braking-operation protective-relay BP is needed, is to make sure that no dynamic-braking motor-connection shall be made, except immediately following a power-circuit energization of the traction-motors, that is, immediately following a motoring operation. This makes sure that the residual magnetisms of the motors are in the proper direction for making a safe dynamic-braking connection, and it avoids the destructive consequences which are entailed when a dynamic-braking circuit is established while one or more of the traction-motors has a reversed residual magnetism, which might occur if the traction-motors had been operating in the opposite direction, at some period prior to the attempted application of dynamic braking. The immediate establishment of relatively weak dynamic-braking motor-connections, as soon as the power-circuit motor-connections are interrupted, and before the motor-flux completely dies down, is also quite desirable, in order to expedite the necessary flux-build-up in the motors, when the dynamic-braking circuits are first established.

In accordance with my present invention, the door-relay back-contacts 233 serve the useful purpose of responding to the loss of a door, during a motoring operation, by immediately energizing the brake-wire 3, which picks up the energization of the protective-relay hold-coil BP-hold, before the BP close-coil can become deenergized. It will be observed that the BP close-coil is energized from the conductor 62 which, when the master-controller MC is on any of its on-positions, remains energized until one of the power-switches LS1 or G1 drops out, which occurs (in an on-position of the master controller), only after the main door-relay DR1 has dropped out in response to the opening of some door-switch 213. The main door-relay DR1 thus closes its back-contact 233 before either one of the main-circuit power switches LS1 or G1 can drop out, and hence before the deenergization of the BP close-coil.

My door-relay back-contacts 233, in immediately energizing the brake-wire 3, also immediately establish the relatively weak coasting-operating dynamic-braking circuit, with all of the dynamic-braking resistances in circuit with the traction-motors, thus establishing a dynamic-braking coasting-circuit in readiness for a full-brake application under the control of the brake-handle 234.

It will be noted that these operations, resulting from the loss of a door during a motoring operation, that is, while the master controller MC is on any one of its three on-positions, take place instantly, without waiting for the motorman to move his master-controller to its off-position.

My provision of an auxiliary door-relay DR2, in combination with an emergency-relay contact 230' which deenergizes said auxiliary door-relay in the event of an emergency-braking application of the air-brakes (not shown), performs a needed service in interrupting the motorman's "on signal" establishment of a power-circuit when he is moving his train, to bring it into a station on signal from the trainman or conductor, even though his main door-relay DR1 is open. Heretofore, in the event of an emergency-brake application during an "on signal" motoring operation, the motorman could deenergize the main power-circuits of the traction-motors by releasing the push-button which he had to hold down, during such "on signal" operation. With my use of an auxiliary door-relay DR2, which holds itself in, whenever the motorman depresses his emergency push-button PB at any time when the master-controller MC is on one of its on-positions, the motorman could deenergize the power-circuits of his motors, in the event of an emergency-brake application, only by moving the controller to its off-position, which takes enough time so that there would be danger of pulling the train apart, or doing other damage. It is advantageous to provide the extra make-contact 230' on the emergency relay ER, so as to instantly and automatically kill or discontinue any motoring operation, in the event of an emergency-brake operation while the motorman is proceeding "on signal," regardless of whether my auxiliary door-relay DR2 is used or not.

As previously mentioned, my use of an auxiliary door-relay DR2, with a make-contact 231 which performs the same function which was previously performed by the motorman's emergency push-button, whereby he could proceed "on signal," frees the motorman's second hand, which was heretofore held immobile by the necessity for holding a finger on the emergency push-button during all the time when he was thus proceeding "on signal." It has happened, on several occasions, that some emergency has required the use of that second hand of the motorman, and also occasions when an inadvertent slight relaxing of the finger-pressure on the emergency door-cutout push-button, has resulted in a loss of dynamic-braking, so that the motorman was then forced to resort to the highly unsatisfactory process of an emergency-braking application, in order to bring his train to a stop. An emergency-braking application is undesirable, except in an extreme emergency, for a great many reasons, among which can be mentioned the fact that if a stop is made on an emergency-brake application, the motorman has to wait as much as two or three minutes (on an eleven-car train, for example) for air to be pumped up again, in the emergency brake-pipe or train-line 206, before he can proceed.

It will be understood, of course, that not all of the described features need to be used in every application of my invention. For example, the braking-operation protective-relay BP, if it is used, could conceivably be used only for the purpose of controlling the establishment, or the establishment and progression, of the dynamic-braking circuit. It is highly desirable, however, to use this protective relay BP to also control the progression of the accelerating-operation of the motors, so that the motorman will be unable to bring his train up to a speed which would be dangerous or undesirable in the event that the BP protective-relay was inoperative, so that the motorman would have no dynamic braking with which to bring his train to a stop, or to check its progress until fade-out of the dynamic-braking torque at a low speed of the train.

If the BP protective-relay is used, it is quite necessary that it shall be opened before each power-circuit energization of the traction-motors, but it is required that the BP protective-relay shall close, or be actuated, again, immediately following a power-circuit energization of the motors. In the illustrated form of embodiment of my invention, as well as in the copending Riley application, this deenergization of the BP relay, immediately prior to a power-circuit motor-energization, is obtained by reason of the M and G back-contacts 242 and 243 in the energizing-circuit for the actuating coil G1 of the ground-switch G1. This ground-switch is energized from the GS train-wire, which is energized only when the master controller is moved from its off-position to one of its on-positions, but the M and G interlocks 242 and 243 prevent the energization of the ground-switch G1 until after the drop-out movement of the switches M and G, which have just been energized from the controller-contact 235, when the master controller MC was in its off-position.

The sequence of the protective-relay operation, therefore, is as follows. In the off-position of the master controller MC, the control-wire 3AB is energized, which energizes the brake-wire 3, which in turn energizes the hold-coil BP-hold of the protective relay BP, keeping this relay closed or actuated, as has previously been described. Before the motorman can do anything which will close the ground-switch G1, he has to move his controller off of the contact 235 which energizes the brake-wires 3AB and 3, so as to deenergize the switches or contactors M and G, which are energized as long as the brake-wire 3 stays energized. The disengagement of the off-position controller-contact 235 thus deenergizes the BP hold-coil at a time when the G1-switch is deenergized, so that the G1 back-contact 246 prevents the energization of the circuit 62 which is connected to the positive terminal of the BP close-coil. This causes the protective relay BP to drop out. After the M and G switches have dropped out, their back-contacts 242 and 243 make possible the immediate energization of the power-switch G1, so that a power-circuit may be established for the traction-motors, instantly reenergizing the BP relay through the G1 make-contact 246 and the wire 62.

If, however, the motorman should interrupt the hold-coil energization of the BP relay, during an off-condition of his master controller MC, as by moving his reverser REV, or opening his control-switch 215, no dynamic braking would be available until after the traction-motors had received a power-circuit energization, in one operating-direction or the other, as determined by the reverser REV, the details of the motor-field reversing-connections being omitted, for the purpose of simplicity, as these reversing-connections are well known in the art.

The previously suggested changes and many other changes may be made, without departing from the essential spirit of my invention. I desire that the illustrated form of embodiment of my invention may be regarded as only an example, and that the appended claims shall be accorded the broadest construction consistent with their language.

I claim as my invention:

1. A railway-motor control-assembly, including the combination, with a traction-motor-means and a door-switch relay-circuit which is closed when the door or doors of the railway-car or cars are all closed, of a door-relay actuated by said door-switch relay-circuit; a supply-circuit for the motor-means; power switch means for establishing a power-circuit for energizing the motor-means from the supply-circuit; braking-switch means for establishing a dynamic-braking circuit for the motor-means; an accelerating-controller having an off-position and an on-position or positions; control-circuit means for effecting a closure of said power-switch means so as to establish a power-circuit for the motor-means in joint response to an open position of a braking-switch means, to an actuated position of said door-relay, and to an on-position of said accelerating-controller; and control-circuit means for effecting a closure of said braking-switch means so as to establish a dynamic-braking motor-circuit in joint response to either a non-actuated position of said door-relay or an off-position of said accelerating-controller, and to an open position of a power-switch means.

2. A railway-motor control-assembly, including the combination, with a traction-motor-means and a door-switch relay-circuit which is closed when the door or doors of the railway-car or cars are all closed, of a door-relay actuated by said door-switch relay-circuit; a supply-circuit for the motor-means; power-switch means for establishing a power-circuit for energizing the motor-means from the supply-circuit; an accelerating-controller having an off-position and an on-position or positions; control-circuit means for effecting a closure of said power-switch means so as to establish a power-circuit for the motor-means in joint response to an actuated position of said door-relay, and to an on-position of said accelerating-controller; switching-means for establishing an emergency door-relay-bypassing circuit for cancelling the aforesaid response to an actuated position of said door-relay; and an emergency-braking control-means having circuit-interrupting contacts which are effective both in the door-switch relay-circuit and in said emergency door-relay-bypassing circuit.

3. A railway-motor control-assembly, including the combination, with a traction-motor-means and a door-switch relay-circuit which is closed when the door or doors of the railway-car or cars are all closed, of a main door-relay actuated by said door-switch relay-circuit; a supply-circuit for the motor-means; power-switch means for establishing a power-circuit for energizing the motor-means from the supply-circuit; an accelerating-controller having an off-position and an on-position or positions; an auxiliary door-relay; means including a push-button whereby said auxiliary door-relay may be actuated; a holding-circuit bypassing said push-button in joint response to an actuated position of said auxiliary door-relay and to an on-position of said accelerating-controller; and control-circuit means for effecting a closure of said power-switch means so as to establish a power-circuit for the motor-means in joint response to an actuated position of either one of said door-relays, and to an on-position of said accelerating-controller.

4. A railway-motor control-assembly, including the combination, with a traction-motor-means and a door-switch relay-circuit which is closed when the door or doors of the railway-car or cars are all closed, of a main door-relay actuated by said door-switch relay-circuit; a supply-circuit for the motor-means; power-switch means for establishing a power-circuit for energizing the motor-means from the supply-circuit; an accelerating-controller having an off-position and an on-position or positions; an auxiliary door-relay; auxiliary-relay actuating-circuit means, whereby said auxiliary door-relay may be actuated; control-circuit means for effecting a closure of said power-switch means so as to establish a power-circuit for the motor-means in joint response to an actuated position of either one of said door-relays, and to an on-position of said accelerating-controller; and an emergency-braking control-means having circuit-interrupting contacts which are effective both in the door-switch relay-circuit and in the actuating circuit of the auxiliary door-relay.

5. A railway-motor control-assembly, including the combination, with a traction-motor-means and a door-switch relay-circuit which is closed when the door or doors of the railway-car or cars are all closed, of a main door-relay actuated by said door-switch relay-circuit; a supply-circuit for the motor-means; power-switch means for establishing a power-circuit for energizing the motor-means from the supply-circuit; braking-switch means for establishing a dynamic-braking circuit for the motor-means; an accelerating-controller having an off-position and an on-position or positions; an auxiliary door-relay; means including a push-button whereby said auxiliary door-relay may be actuated; a holding-circuit bypassing said push-button in joint response to an actuated position of said auxiliary door-relay and to an on-position of said accelerating-controller; control-circuit means for effecting a closure of said power-switch means so as to establish a power-circuit for the motor-means in joint response to an open position of a braking-switch means, to an actuated position of either one of said door-relays, and to an on-position of said accelerating-controller; and control-circuit means for effecting a closure of said braking-switch means so as to establish a dynamic-braking motor-circuit in joint response to an off-position of said accelerating-controller and to an open position of a power-switch means.

6. A railway-motor control-assembly, including the combination, with a traction-motor-means and a door-switch relay-circuit which is closed when the door or doors of the railway-car or cars are all closed, of a main door-relay actuated by said door-switch relay-circuit; a supply-circuit for the motor-means; power-switch means for establishing a power-circuit for energizing the motor-means from the supply-circuit; braking-switch means for establishing a dynamic-braking circuit for the motor-means; an accelerating-controller having an off-position and an on-position or positions; an auxiliary door-relay; auxiliary-relay actuating-circuit means, whereby said auxiliary door-relay may be actuated; control-circuit means for effecting a closure of said power-switch means so as to establish a power-circuit for the motor-means in joint response to an open position of a braking-switch means, to an actuated position of either one of said door-relays, and to an on-position of said accelerating-controller; control-circuit means for effecting a closure of said braking-switch means so as to establish a dynamic-braking motor-circuit in joint response to an off-position of said accelerating-controller and to an open position of a power-switch means; and an emergency-braking control-means having circuit-interrupting contacts which are effective both in the door-switch relay-circuit and in the actuating circuit of the auxiliary door-relay.

7. A railway-motor control-assembly, including the combination, with a traction-motor-means and a door-switch relay-circuit which is closed when the door or doors of the railway-car or cars are all closed, of a main door-relay actuated by said door-switch relay-circuit; a supply-circuit for the motor-means; power-switch means for establishing a power-circuit for energizing the motor-means from the supply-circuit; braking-switch means for establishing a dynamic-braking circuit for the motor-means; an accelerating-controller having an off-position and an on-position or positions; an auxiliary door-relay; auxiliary-relay actuating-circuit means, whereby said auxiliary door-relay may be actuated; control-circuit means for effecting a closure of said power-switch means so as to establish a power-circuit for the motor-means in joint response to an open position of a braking-switch means, to an actuated position of either one of said door-relays, and to an on-position of said accelerating-controller; and control-circuit means for effecting a closure of said braking-switch means so as to establish a dynamic-braking motor-circuit in joint response to either non-actuated positions of both of said door-relays or an off-position of said accelerating-controller, and to an open position of a power-switch means.

8. The invention as defined in claim 7, characterized by said auxiliary-relay actuating-means including a push-button, and holding-circuit bypassing said push-button in joint response to an actuated position of said auxiliary door-relay and to an on-position of said accelerating-controller.

9. The invention as defined in claim 7, in combination with an emergency-braking control-means having circuit-interrupting contacts which are effective both in the door-switch relay-circuit and in the actuating circuit of the auxiliary door-relay.

10. A railway-motor control-assembly, including the combination, with a traction-motor-means and a door-switch relay-circuit which is closed when the door or doors of the railway-car or cars are all closed, of a door-relay actuated by said door-switch relay-circuit; a supply-circuit for the motor-means; power-switch means for establishing a power-circuit for energizing the motor-means from the supply-circuit; braking-switch means for establishing a dynamic-braking circuit for the motor-means; an accelerating-controller having an off-position and an on-position or positions; a motoring-circuit on-position controller-contact means, which is closed when said accelerating-controller is moved from its off-position; control-circuit means for effecting a closure of said power-switch means so as to establish a power-circuit for the motor-means in joint response to an open position of a braking-switch means, to an actuated position of said door-relay, and to an on-position of said accelerating-controller, including a response to said motoring-circuit on-position controller-contact means; a braking-circuit off-position controller-contact means, which is closed when said accelerating-controller is in its off-position, there being an overlapping point when both said motoring-circuit and braking-circuit controller-contact means are closed; a protective relay; control-circuit means for effecting an actuation of said protective relay in response to the establishment of a power-circuit for said motor-means; holding-means for holding said protective relay in its actuated position in response to either a non-actuated position of said door-relay or a closure of said braking-circuit off-position controller-contact means, said holding-means being effective only after said protective relay has previously been moved to its actuated position; and control-circuit means for effecting a closure of said braking-switch means so as to establish a dynamic-braking motor-circuit in joint response to either a non-actuated position of said door-relay or an off-position of said accelerating-controller, to an open position of a power-switch means, and to an actuated position of said protective relay; the drop-out rate of said door-relay, in returning from its actuated position to its non-actuated position, being sufficiently fast to keep the protective relay energized if said drop-out should occur during power-circuit operation of the motor means.

11. A railway-motor control-assembly, including the combination, with a traction-motor-means and a door-switch relay-circuit which is closed when the door or doors of the railway-car or cars are all closed, of a door-relay actuated by said door-switch relay-circuit; a supply-circuit for the motor-means; power-switch means for establishing a power-circuit for energizing the motor-means from the supply-circuit; braking-switch means for establishing a dynamic-braking circuit for the motor-means; progressively operating current-controlling means for controlling the motor-current; progressively operating braking-controlling means for controlling dynamic-braking motor-conditions; a limit-relay or relays energized to be responsive to conditions which accompany excessive torque in the motor-means; an accelerating-controller having an off-position and an on-position or positions; a braking-controller having an off-position and an on-position or positions; a motoring-circuit on-position controller-contact means, which is closed when said accelerating-controller is moved from its off-position; control-circuit means for effecting a closure of said power-switch means so as to establish a power-circuit for the motor-means in joint response to an open position of a braking-switch means, to an actuated position of said door-relay, and to an on-position of said accelerating-controller, including a response to said motoring-circuit on-position controller-contact means; a braking-circuit off-position controller-contact means, which is closed when said accelerating-controller is in its off-position, there being an overlapping point when both said motoring-circuit and braking-circuit controller-contact means are closed; a protective relay; control-circuit means for effecting an actuation of said protective relay in response to the establishment of a power-circuit for said motor-means; holding-means for holding said protective relay in its actuated position in response to either a non-actuated position of said door-relay or a closure of said braking-circuit off-position controller-contact means, said holding-means being effective only after said protective relay has previously been moved to its actuated position, control-circuit means for causing a progressing operation of said progressively operating current-controlling means in joint response to the establishment of a power-circuit for said motor-means, to an on-position of said accelerating-controller and to the position of a limit-relay; control-circuit means for effecting a closure of said braking-switch means so as to establish a relatively weak dynamic-braking motor-circuit in joint response to either a non-actuated position of said door-relay or an off-position of said accelerating-controller, to an open position of a power-switch means, and to an actuated position of said protective relay; and control-circuit means for causing a progressing operation of said progressively operating braking-controlling means in joint response to an on-position of said braking-controller, to an actuated position of said protective relay, and to the position of a limit-relay; the drop-out rate of said door-relay, in returning from its actuated position to its non-actuated position, being sufficiently fast to keep the protective relay energized if said drop-out should occur during power-circuit operation of the motor-means.

12. A railway-motor control-assembly, including the combination, with a traction-motor-means and a door-switch relay-circuit which is closed when the door or doors of the railway-car or cars are all closed, of a door-relay actuated by said door-switch relay-circuit; a supply-circuit for the motor-means; power-switch means for establishing a power-circuit for energizing the motor-means from the supply-circuit; braking-switch means for establishing a dynamic-braking circuit for the motor-means; progressively operating current-controlling means for controlling the motor-current; progressively operating braking-controlling means for controlling dynamic-braking motor-conditions; a limit-relay or relays energized to be responsive to conditions which accompany excessive torque in the motor-means; an accelerating-controller having an off-position and an on-position or positions; a braking-controller having an off-position and an on-position or positions; a motoring-circuit on-position controller-contact means, which is closed when said accelerating-controller is moved from its off-position; control-circuit means for effecting a closure of said power-switch means so as to establish a power-circuit for the motor-means in joint response to an open position of a braking-switch means, to an actuated position of said door-relay, and to an on-position of said accelerating-controller, including a response to said motoring-circuit on-position controller-contact means; a braking-circuit off-position controller-contact means, which is closed when said accelerating-controller is in its off-position, there being an overlapping point when both said motoring-circuit and braking-circuit controller-contact means are closed; a protective relay; control-circuit means for effecting an actuation of said protective relay in response to the establishment of a power-circuit for said motor-means; holding-means for holding said protective relay in its actuated position in response to either a non-actuated position of said door-relay or a closure of said braking-circuit off-position controller-contact means, said holding-means being effective only after said protective relay has previously been moved to its actuated position; control-circuit means for causing a progressing operation of said progressively operating current-controlling means in joint response to an on-position of said accelerating-controller, to an actuated position of said protective relay, and to the position of a limit-relay; control-circuit means for effecting a closure of said braking-switch means so as to establish a relatively weak dynamic-braking motor-circuit in joint response to either a non-actuated position of said door-relay or an off-position of said accelerating-controller, to an open position of a power-switch means, and to an actuated position of said protective relay; and control-circuit means for causing a progressing operation of said progressively operating braking-controlling means in joint response to an on-position of said braking-controller, to an actuated position of said protective relay, and to the position of a limit-relay; the drop-out rate of said door-relay, in returning from its actuated position to its non-actuated position, being sufficiently fast to keep the protective relay energized if said drop-out should occur during power-circuit operation of the motor-means.

13. A railway-motor control-assembly, including the combination, with a traction-motor-means and a door-switch relay-circuit which is closed when the door or doors of the railway-car or cars are all closed, of a main door-relay actuated by said door-switch relay-circuit; a supply-circuit for the motor-means; power-switch means for establishing a power-circuit for energizing the motor-means from the supply-circuit; braking-switch means for establishing a dynamic-braking circuit for the motor-means; an accelerating-controller having an off-position and an on-position or positions; a motoring-circuit on-position controller-contact means, which is closed when said accelerating-controller is moved from its off-position; an auxiliary door-relay; auxiliary-relay actuating-circuit means whereby said auxiliary door-relay may be actuated; control-circuit means for effecting a closure of said power-switch means so as to establish a power-circuit for the motor-means in joint response to an open position of a braking-switch means, to an actuated position of either one of said door-relays, and to an on-position of said accelerating-controller, including a response to said motoring-circuit on-position controller-contact means; a braking-circuit off-position controller-contact means, which is closed when said accelerating-controller is in its off-position, there being an overlapping point when both said motoring-circuit and braking-circuit controller-contact means are closed; a protective relay; control-circuit means for effecting an actuation of said protective relay in response to the establishment of a power-circuit for said motor-means; holding-means for holding said protective relay in its actuated position in response to a closure of said braking-circuit off-position controller-contact means, said holding means being effective only after said protective relay has previously been moved to its actuated position; and control-circuit means for effecting a closure of said braking-switch means so as to establish a dynamic-braking motor-circuit in joint response to an off-position of said accelerating-controller, to an open position of a power-switch means, and to an actuated position of said protective relay.

14. The invention as defined in claim 13, characterized by said auxiliary-relay actuating-means including a push-button, and a holding-circuit bypassing said push-button in joint response to an actuated position of said auxiliary door-relay and to an on-position of said accelerating-controller.

15. The invention as defined in claim 13, in combination with an emergency-braking control-means having circuit-interrupting contacts which are effective both in the door-switch relay-circuit and in the actuating circuit of the auxiliary door-relay.

16. A railway-motor control-assembly, including the combination, with a traction-motor-means and a door-switch relay-circuit which is closed when the door or doors of the railway-car or cars are all closed, of a main door-relay actuated by said door-switch relay-circuit; a supply-circuit for the motor-means; power-switch means for establishing a power-circuit for energizing the motor-means from the supply circuit; braking-switch means for establishing a dynamic-braking circuit for the motor-means; progressively operating current - controlling means for controlling the motor-current; progressively operating braking-controlling means for controlling dynamic-braking motor-conditions; a limit-relay or relays energized to be responsive to conditions which accompany excessive torque in the motor-means; an accelerating-controller having an off-position and an on-position or positions; a braking-controller having an off-position and an on-position or positions; a motoring-circuit on-position controller-contact means, which is closed when said accelerating-controller is moved from its off-position; an auxiliary door-relay; auxiliary-relay actuating-circuit means whereby said auxiliary door-relay may be actuated; control-circuit means for effecting a closure of said power-switch means so as to establish a power-circuit for the motor-means in joint response to an open position of a braking-switch means, to an actuated position of either one of said door-relays, and to an on-position of said accelerating-controller, including a response to said motoring-circuit on-position controller-contact means; a braking-circuit off-position controller-contact means, which is closed when said accelerating-controller is in its off-position, there being an overlapping point when both said motoring-circuit and braking-circuit controller-contact means are closed; a protective relay; control-circuit means for effecting an actuation of said protective relay in response to the establishment of a power-circuit for said motor-means; holding-means for holding said protective relay in its actuated position in response to a closure of said braking-circuit off-position controller-contact means, said holding-means being effective only after said protective relay has previously been moved to its actuated position; control-circuit means for causing a progressing operation of said progressively operating current-controlling means in joint response to an on-position of said accelerating-controller, to an actuated position of said protective relay, and to the position of a limit-relay; control-circuit means for effecting a closure of said braking-switch means so as to establish a relatively weak dynamic-braking motor-circuit in joint response to an off-position of said accelerating-controller, to an open position of a power-switch means, and to an actuated position of said protective relay; and control-circuit means for causing a progressing operation of said progressively operating braking-controlling means in joint response to an on-position of said braking-controller, to an actuated position of said protective relay, and to the position of a limit-relay.

17. The invention as defined in claim 16, characterized by said auxiliary-relay actuating-means including a push-button, and a holding-circuit bypassing said push-button in joint response to an actuated position of said auxiliary door-relay and to an on-position of said accelerating-controller.

18. The invention as defined in claim 16, in combination with an emergency-braking control-means having circuit-interrupting contacts which are effective both in the door-switch relay-circuit and in the actuating circuit of the auxiliary door-relay.

19. A railway-motor control-assembly, including the combination, with a traction-motor-means and a door-switch relay-circuit which is closed when the door or doors of the railway-car or cars are all closed, of a main door-relay actuated by said door-switch relay-circuit; a supply-circuit for the motor-means; power-switch means for establishing a power-circuit for energizing the motor-means from the supply-circuit; braking-switch means for establishing a dynamic-braking circuit for the motor-means; progressively operating current-controlling means for controlling the motor-current; progressively operating braking-controlling means for controlling dynamic-braking motor-conditions; a limit-relay or relays energized to be responsive to conditions which accompany excessive torque in the motor-means; an accelerating-controller having an off-position and an on-position or positions; a braking-controller having an off-position and an on-position or positions; a motoring-circuit on-position controller-contact means, which is closed when said accelerating-controller is moved from its off-position; an auxiliary door-relay; auxiliary-relay actuating-circuit means whereby said auxiliary door-relay may be actuated; control-circuit means for effecting a closure of said power-switch means so as to establish a power-circuit for the motor-means in joint response to an open position of a braking-switch means, to an actuated position of either one of said door-relays, and to an on-position of said accelerating-controller, including a response to said motoring-circuit on-position controller-contact means; a braking-circuit off-position controller-contact means, which is closed when said accelerating-controller is in its off-position, there being an overlapping point when both said motoring-circuit and braking-circuit controller-contact means are closed; a protective relay; control-circuit means for effecting an actuation of said protective relay in response to the establishment of a power-circuit for said motor-means; holding-means for holding said protective relay in its actuated position in response to either non-actuated positions of both of said door-relays or a closure of said braking-circuit off-position controller-contact means, said holding-means being effective only after said protective relay has previously been moved to its actuated position; control-circuit means for causing a progressing operation of said progressively operating current-controlling means in joint response to the establishment of a power-circuit for said motor-means, to an on-position of said accelerating-controller and to the position of a limit-relay; control-circuit means for effecting a closure of said braking-switch means so as to establish a relatively weak dynamic-braking motor-circuit in joint response to either non-actuated positions of both of said door-relays or an off-position of said accelerating-controller, to an open position of a power-switch means, and to an actuated position of said protective relay; and control-circuit means for causing a progressing operation of said progressively operating braking-controlling means in joint response to an on-position of said braking-controller, to an actuated position of said protective relay, and to the position of a limit-relay; the drop-out rate of said main door-relay, in returning from its actuated position to its non-actuated position, being sufficiently fast to keep the protective relay energized if said drop-out should occur during power-circuit operation of the motor-means.

20. The invention as defined in claim 19, characterized by said auxiliary-relay actuating-means including a push-button, and a holding-circuit bypassing said push-button in joint response to an actuated position of said auxiliary door-relay and to an on-position of said accelerating-controller.

21. The invention as defined in claim 19, in combination with an emergency-braking control-means having circuit-interrupting contacts which are effective both in the door-switch relay-circuit and in the actuating circuit of the auxiliary door-relay.

22. A railway-motor control-assembly, including the combination, with a traction-motor means and a door-switch relay-circuit which is closed when the door or doors of the railway-car or cars are all closed, of a main door-relay actuated by said door-switch relay-circuit; a supply-circuit for the motor-means; power-switch means for establishing a power-circuit for energizing the motor-means from the supply-circuit; braking-switch means for establishing a dynamic-braking circuit for the motor-means; progressively operating current-controlling means for controlling the motor-current; progressively operating braking-controlling means for controlling dynamic-braking motor-conditions; a limit-relay or relays energized to be responsive to conditions which accompany excessive torque in the motor-means; an accelerating-controller having an off-position and an on-position or positions; a braking-controller having an off-position and an on-position or positions; a motoring-circuit on-position controller-contact means, which is closed when said accelerating-controller is moved from its off-position; an auxiliary door-relay; auxiliary-relay actuating-circuit means whereby said auxiliary door-relay may be actuated; control-circuit means for effecting a closure of said power-switch means so as to establish a power-circuit for the motor-means in joint response to an open position of a braking-switch means, to an actuated position of either one of said door-relays, and to an on-position of said accelerating-controller, including a response to said motoring-circuit on-position controller-contact means; a braking-circuit off-position controller-contact means, which is closed when said accelerating-controller is in its off-position, there being an overlapping point when both said motoring-circuit and braking-circuit controller-contact means are closed; a protective relay; control-circuit means for effecting an actuation of said protective relay in response to the establishment of a power-circuit for said motor-means; holding means for holding said protective relay in its actuated position in response to either non-actuated positions of both of said door-relays or a closure of said braking-circuit off-position controller-contact means, said holding-means being effective only after said protective relay has previously been moved to its actuated position; control-circuit means for causing a progressing operation of said progressively operating current-controlling means in joint response to an on-position of said accelerating-controller, to an actuated position of said protective relay, and to the position of a limit-relay; control-circuit means for effecting a closure of said braking-switch means so as to establish a relatively weak dynamic-braking motor-circuit in joint response to either non-actuated positions of both of said door-relays or an off-position of said accelerating-controller, to an open position of a power-switch means, and to an actuated position of said protective relay; and control-circuit means for causing a progressing operation of said progressively operating braking-controlling means in joint response to an on-position of said braking-controller, to an actuated position of said protective relay, and to the position of a limit-relay; the drop-out rate of said main door-relay, in returning from its actuated position to its non-actuated position, being sufficiently fast to keep the protective relay energized if said drop-out should occur during power-circuit operation of the motor-means.

23. The invention as defined in claim 22, characterized by said auxiliary-relay actuating-means including a push-button, and a holding-circuit bypassing said push-button in joint response to an actuated position of said auxiliary door-relay and to an on-position of said accelerating-controller.

24. The invention as defined in claim 22, in combination with an emergency-braking control means having circuit-interrupting contacts which are effective both in the door-switch relay-circuit and in the actuating circuit of the auxiliary door-relay.

JOHN E. DRAKE.

No references cited.